United States Patent [19]

Isert

[11] Patent Number: 4,547,025
[45] Date of Patent: Oct. 15, 1985

[54] GUIDE BEARING FOR A LINEAR BODY

[76] Inventor: Hugo Isert, Bahnhofstrasse 33, D-6419 Eiterfeld 1, Fed. Rep. of Germany

[21] Appl. No.: 582,638

[22] Filed: Feb. 22, 1984

[30] Foreign Application Priority Data

Mar. 7, 1983 [DE] Fed. Rep. of Germany ....... 3307993

[51] Int. Cl.[4] .......................... F16C 29/06; F16C 31/04
[52] U.S. Cl. .................................................. 308/6 C
[58] Field of Search ............. 308/6 R, 6 A, 6 C, 203; 464/168; 384/549

[56] References Cited

U.S. PATENT DOCUMENTS

| 3,353,875 | 11/1967 | Karge | 308/6 C |
| 3,758,176 | 9/1973 | Stapley | 308/6 C |
| 3,845,993 | 11/1974 | Schiler | 309/6 C |

FOREIGN PATENT DOCUMENTS

| 80515 | 6/1983 | European Pat. Off. . |
| 488310 | 12/1929 | Fed. Rep. of Germany . |
| 866278 | 12/1952 | Fed. Rep. of Germany . |
| 1167603 | 4/1964 | Fed. Rep. of Germany . |

Primary Examiner—Stuart S. Levy
Assistant Examiner—Lynn M. Sohacki
Attorney, Agent, or Firm—Fred Philpitt

[57] ABSTRACT

A guide bearing for a linear body, such as a shaft, a rod or the like, comprising in combination a housing having an interior space, and an exterior face in the form of an outwardly concave wall that has two spaced apart parallel elongated slots therein that are in open communication with said interior space, two spaced apart parallel ball raceways located adjacent said elongated slots in said interior space, said raceways being in the form of endless loops and containing a plurality of balls, and cover plates which maintain said raceways in position within said housing, and wherein the width of each of said two spaced apart elongated slots is less than the diameter of the balls which move past said slots in said raceways so that only a portion of said balls will protrude outwardly through said concave wall of the housing for contact with said linear body.

7 Claims, 3 Drawing Figures

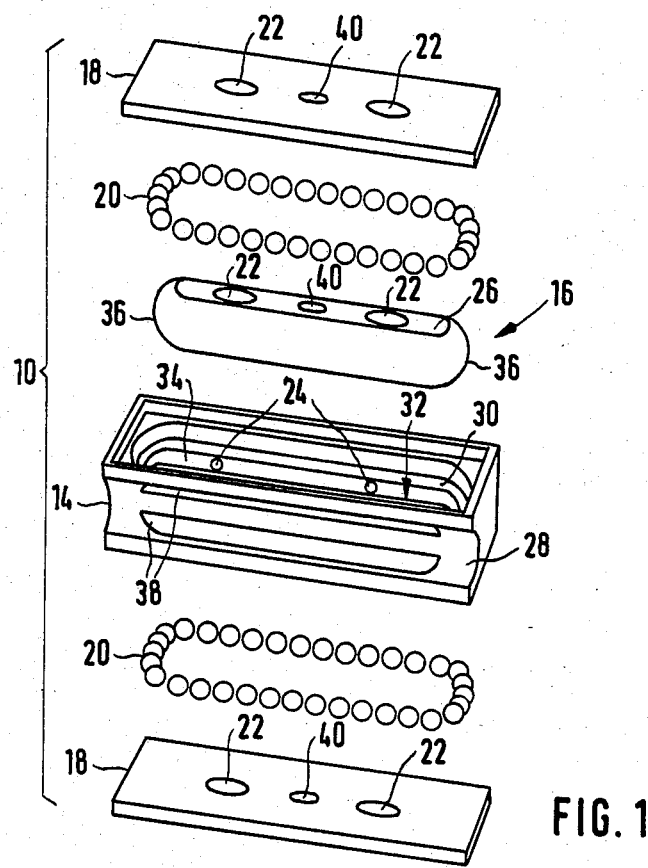
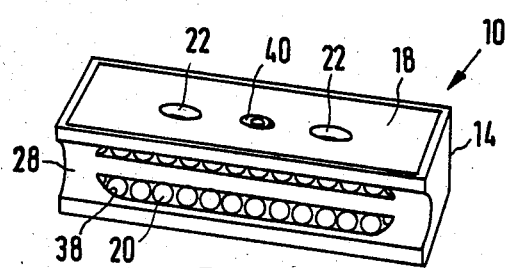
FIG. 2
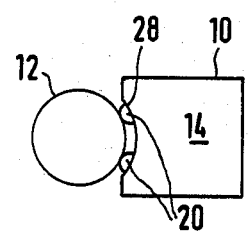
FIG. 3

GUIDE BEARING FOR A LINEAR BODY

FIELD OF THE INVENTION

The invention relates to a guide bearing that is intended to guide a tool or any other article by two tracks along or on a linear body, e.g. a running rail having a tread of convex cross section.

BACKGROUND OF THE INVENTION

A linear ball bearing as disclosed in EP-A1-0 080 515 is an integral part of a special guiding system. That bearing comprises a cuboid seating body which is open towards a linear body, such as a running rail, and which centrally houses a cylindrical runner body having semispherical ends. Two ball raceways, i.e. closed loops of loose balls, revolve in parallel planes on the runner body and engage the running rail at the open face of the seating body whose end walls are concave inside to accomodate the runner body ends.

OBJECTS OF THE INVENTION

It is an important object of the invention to improve previous linear ball bearings so as to create a guide bearing generally suited for supporting and guiding linear bodies as an individual component.

Another object of the invention consists in developing a precise guide bearing for linear bodies adapted to be economically mass-produced.

SUMMARY OF THE INVENTION

It is distinctive for the invention that the two series of balls or ball raceways which revolve in parallel closed loops on a runner body partly extend through longitudinal slots in a concave wall of the seating body. The slot width is smaller than the diameter of the balls so that the balls are safely retained.

SPECIALIZATIONS OF THE INVENTION

The invention provides for a partition in the seating body dividing its interior into two compartments and encompassing, with the border of an aperture, the runner body in its longitudinal central plane. Each of the two chambers thus formed houses one revolving ball series or raceway and is closed by a cover plate which is a removable chamber lid parallel to the partition. The seating body is expediently of one piece, e.g. of a plastics material warranting dimensional accuracy. The runner body and the two cover plates are preferably of steel and have hardened and ground bearing faces.

In a preferred embodiment, the runner body has two longitudinal flats on either side. This provides for a relatively large support area for the cover plates which may be secured by means of a connecting screw bolt and nut. Eccentric bolts such as utilized in the conventional linear ball bearings for attachment and adjustment purposes serve to firmly press the cover plates onto the runner body. Following proper adjustment, the raceway balls are each supported at three points, viz. by the running rail of the seating body, by the runner body and by the cover plates.

In the annexed drawings:

FIG. 1 is a perspective exploded view of a guide bearing according to the invention, FIG. 2 is a perspective view of the assembled guide bearing of FIG. 1 and FIG. 3 is a side elevation of the guide bearing shown in FIG. 2.

DESCRIPTION

As will be evident from FIG. 1, a guide bearing 10 comprises a seating body or housing 14 for a central runner body 16 and two identical series of balls in raceways 20 as well as two identical cover plates 18 which close one chamber each formed through a partition 30 in the seating body 14.

Partition 30 includes a wide central aperture 32 the border 34 of which encompasses the inserted runner body 16. Outwardly, partition 30 is easily seen to be integral with a wall strip extending between two parallel longitudinal slots 38 in a partly open front wall 28 of seating body 14.

The slotted front wall 28 is a concave face preferably matching the curvature of the running tread of the linear body 12 associated (FIG. 3). FIG. 2 shows that the width of slots 38 is somewhat smaller than the diameter of the balls of the raceways 20. A centric bore 40 in the two cover plates 18 and in the bolt-shaped runner body 16 permits securing the two cover plates by means of a screw bolt and nut or the like. Two larger transverse bores 22 in each of the three components mentioned serve to receive eccentric bolts (not shown) for attachment and adjustment purposes. Two smaller bores or holes 24 in the border 34 of central aperture 32 in partition 30 are useful for manufacture, e.g. as seats for fixing means, jigs, etc.

The guide bearing 10 assembled from the parts shown in FIG. 1 is displayed in FIG. 2 and also in FIG. 3 where it is engaged to a linear body 12 of cylindrical cross section. Such linear body may consist of a shaft or rod but may also be composed of several such elements.

While preferred embodiments have been illustrated and explained hereinabove, it should be understood that numerous variations and modifications will be apparent to one skilled in the art without departing from the principles of the invention which, therefore, is not to be construed as being limited to the specific forms described.

I claim:

1. A guide bearing for a linear body, such as a shaft, a rod or the like, comprising in combination
   (a) a housing having
      (1) an interior space, and
      (2) an exterior face in the form of an outwardly concave wall that has two spaced apart parallel elongated slots therein that are in open communication with said interior space,
   (b) a runner body positioned in said interior so as to form with the interior of said housing two spaced apart parallel ball raceways located adjacent said elongated slots in said interior space, said raceways being in the form of endless loops and containing a plurality of balls, and
   (c) cover plates which maintain said runner body in position within said housing, wherein the width of each of said two spaced apart elongated slots is less than the diameter of the balls which move past said slots in said raceways so that only a portion of said balls will protrude outwardly through said concave wall of the housing for contact with said linear body.

2. Guide bearing according to claim 1 wherein said runner body and the cover plates are of steel and have hardened and ground bearing faces.

3. Guide bearing according to claim 1 wherein said raceways are parallel to said cover plates.

4. Guide bearing according to claim 1 wherein the housing is divided into two chambers by an intermediate partition.

5. Guide bearing according to claim 1 wherein said housing is made of dimensionally stable plastic material.

6. A guide bearing according to claim 1 wherein at least two transverse bores extend through said housing, said runner body and said cover plates.

7. A guide bearing according to claim 1 wherein said housing is provided with holes extending up to the ball series and/or to the runner body.

* * * * *